US005230240A

United States Patent [19]

Ohsawa et al.

[11] Patent Number: 5,230,240

[45] Date of Patent: Jul. 27, 1993

[54] COMBUSTION DETECTING APPARATUS FOR INTERNAL COMBUSTION ENGINE

[75] Inventors: Toshio Ohsawa; Toshio Iwata, both of Himeji, Japan

[73] Assignee: Mitsubishi Denki Kabushiki Kaisha, Tokyo, Japan

[21] Appl. No.: 833,796

[22] Filed: Feb. 12, 1992

[30] Foreign Application Priority Data

Feb. 15, 1991 [JP] Japan .................................. 3-022197
Feb. 19, 1991 [JP] Japan .................................. 3-023647

[51] Int. Cl.[5] .......................................... G01M 15/00
[52] U.S. Cl. ...................................... 73/116; 324/459
[58] Field of Search ...................... 73/116, 35 I, 117.3; 123/620, 625, 626; 324/378, 459

[56] References Cited

U.S. PATENT DOCUMENTS 4,762,106 8/1988 Blauhut .............................. 123/425
4,987,771 1/1991 Iwata ................................ 73/117.3
5,067,462 11/1991 Iwata et al. ......................... 123/414
5,178,001 1/1993 Ikeuchi et al. ..................... 73/117.3

FOREIGN PATENT DOCUMENTS 2507286 1/1978 Fed. Rep. of Germany .
4116272 11/1991 Fed. Rep. of Germany .
4133015 4/1992 Fed. Rep. of Germany .

OTHER PUBLICATIONS

MTZ, Band 51, 1990, Heft 3, Seiten 118–112.

*Primary Examiner*—Jerry W. Myracle
*Attorney, Agent, or Firm*—Sughrue, Mion, Zinn, Macpeak & Seas

[57] ABSTRACT

A combustion detecting apparatus for an internal combustion engine capable of discriminatively detecting the state of combustion, normal combustion or abnormal combustion such as misfiring, from each other. By applying a voltage of positive polarity to a spark plug for each engine cylinder, an ion current of negative polarity, which is generated upon combustion of a mixture in the cylinder, is detected. Subsequently, the detected ion current signal of negative polarity is transformed to a signal of positive polarity which is then subjected to waveform shaping by using comparators to obtain an ion current detection output signal which is utilized in making decision as to occurrence of misfiring. By making use of the ion current of negative polarity, a high signal level is realized to detect the state of combustion with high reliability even in a high speed or under a heavy load of the engine. By providing a low pass filter which can pass only a shaped signal component having a duration longer than a predetermined time, noise components usually of a short duration can be eliminated to improve combustion detection.

8 Claims, 5 Drawing Sheets

COMBUSTION DETECTING APPARATUS FOR INTERNAL COMBUSTION ENGINE

BACKGROUND OF THE INVENTION

The present invention relates generally to a combustion detecting apparatus for an internal combustion engine. More particularly, the invention is concerned with a combustion detecting apparatus which is capable of detecting the state of combustion (normal combustion or abnormal combustion such as misfiring) by sensing an ion current generated by combustion of a mixture with enhanced reliability.

For a better understanding of the invention, a known combustion detecting apparatus for an engine will first be described by reference to FIG. 5 which is a circuit diagram showing the circuit arrangement of the apparatus. Referring to this figure, a power transistor 1, which is turned on and off in response to application of an ignition signal, has a collector connected to a primary winding of an ignition coil 2 which has a secondary winding connected to a movable contact of a distributor 3. A plurality of spark plugs, generally denoted by reference numeral 4, are connected to fixed or stationary contacts of the distributor 3, respectively. Further, a plurality of ion current sensing diodes 5 are connected to the corresponding spark plugs 4, respectively, and have respective output terminals connected together to an ion current detecting circuit 6 for detecting an ion current. The ion current detecting circuit 6 includes a comparator 7 for comparing an ion current detection signal with a reference value, and generating an output signal at an output terminal 8 thereof.

Operation of the combustion detecting apparatus implemented in the above structure will next be described by reference to a timing chart shown in FIG. 6. When an ignition pulse signal S101 having a waveform, as illustrated at (a) in FIG. 6, is applied to a base of the power transistor 1, the transistor is turned on. When the power transistor 1 is turned off at a falling edge of the ignition pulse signal, a high voltage signal S102 having a waveform illustrated at (b) in FIG. 6 is induced across the secondary winding of the ignition coil 2. The high voltage signal S102 thus generated is supplied to the spark plugs 4 of the individual engine cylinders through the distributor 3 to bring about combustion of an air/fuel mixture in the respective cylinders. As a result of this combustion, an ion current or flow is generated. Of the ion flow, only the positive ions or cations are detected by the diode 5, whereby an ion current sensing signal S103 having such a waveform as illustrated at (c) in FIG. 6 is generated and then compared with a reference value by the comparator 7. As a result of this, an ion current detection output signal S104 of a waveform shown at (d) in FIG. 6 is obtained at the output terminal 8. When the ion current detection output signal S104 is of a high level, decision is made that normal combustion took place. On the contrary, if the signal S104 is of a low level, occurrence of misfiring is determined.

The known combustion detecting apparatus for the internal combustion engine suffers from a disadvantage that reliability in the ion current detection and hence in decision as to the occurrence of combustion or misfiring is poor, involving erroneous decision. This can be explained by the fact that the detection level for comparison with the predetermined level becomes lowered particularly when the engine is operated at a high speed or under a heavy load, because the ion current detection is based on detection of the positive ions or cations produced upon combustion of the air/fuel mixture.

Further, the combustion detection apparatus known heretofore encounters such difficulty that when the apparatus is installed on a motor vehicle, noise originating in various noise sources in the vehicle will be superposed on the ion current detection output signal to thereby give rise to a high-level detection signal, erroneously indicating the normal combustion, even when misfiring took place, to a further disadvantage.

SUMMARY OF THE INVENTION

In the light of the state of the art described above, it is an object of the present invention to provide an improved combustion detecting apparatus for an internal combustion engine which can always correctly detect the ion current level with high reliability.

It is a further object of the present invention to provide an improved combustion detecting apparatus which is essentially insusceptible to the adverse influence of noise and which can discriminatively detect combustion and misfiring with high reliability and accuracy.

In view of the above and other objects which will become apparent as description proceeds, there is provided according to one aspect of the present invention a combustion detecting apparatus for an internal combustion engine, which apparatus comprises: ion current detecting means for applying a voltage of positive polarity to a spark plug of a cylinder of the engine to detect an ion current of negative polarity produced by combustion of an air/fuel mixture within the cylinder, the current detecting means being operable to output an ion current detection signal of negative polarity; conversion means for converting the ion current detection signal to a signal of positive polarity; and waveform shaping means for shaping the signal of positive polarity from the conversion means by using a predetermined voltage for comparison to generate a combustion detection signal indicative of the state of combustion in the cylinder.

Preferably, filter means is provided for allowing the passage of only the output signal of the waveform shaping means which has a duration longer than a predetermined time.

According to another aspect of the invention, there is provided a combustion detecting apparatus for an internal combustion engine, which apparatus comprises: ion current detecting means for applying a voltage of positive polarity to a spark plug of a cylinder of the engine to detect an ion current of negative polarity which is produced by combustion of an air/fuel mixture within the cylinder, the ion current detecting means being operable to output an ion current detection signal of negative polarity; biasing means for shifting the ion current detection signal of negative polarity by a predetermined bias voltage into a positive signal; first comparison means for comparing the shifted ion current detection signal of positive polarity with a first reference voltage of positive polarity; filter means for allowing the passage of only the output signal of the first comparison means which has a duration longer than a predetermined time; second comparison means for comparing the output of the filter means with a second reference voltage; and invertor means for inverting the voltage level of the output signal of the second comparison means from a high to a low level and the vice versa to provide a signal indicative of the state of combustion within the cylinder.

The above and other objects, advantages and features of the invention will be better understood by reading the following description of the preferred embodiments thereof taken in conjunction with the accompanying drawings.

DESCRIPTION OF THE PREFERRED EMBODIMENTS

The present invention will now be described in detail in conjunction with preferred or exemplary embodiments thereof by reference to the drawings.

Figure 1:
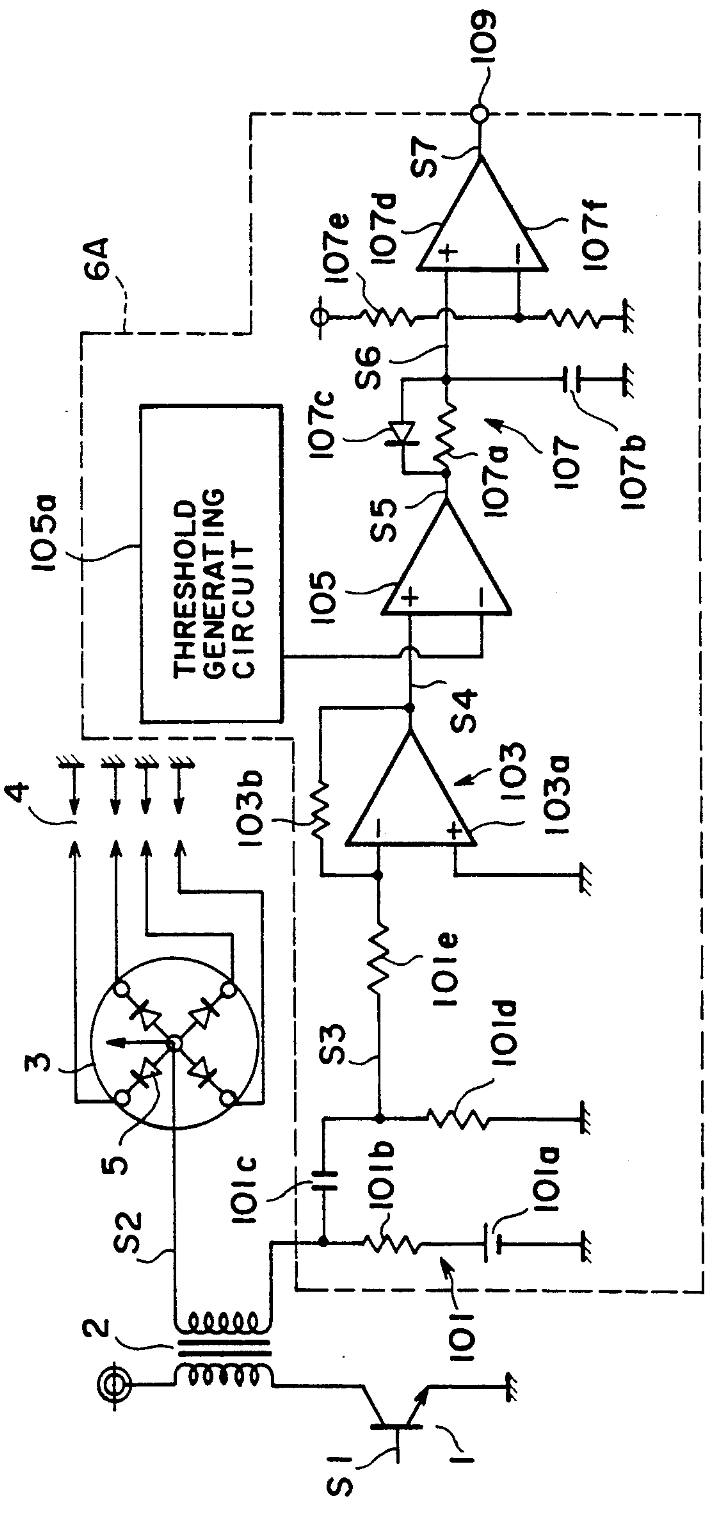
FIG. 1 is a circuit diagram showing a circuit arrangement of a combustion detecting apparatus for an internal combustion engine according to a first embodiment of the invention.
Figure 5:
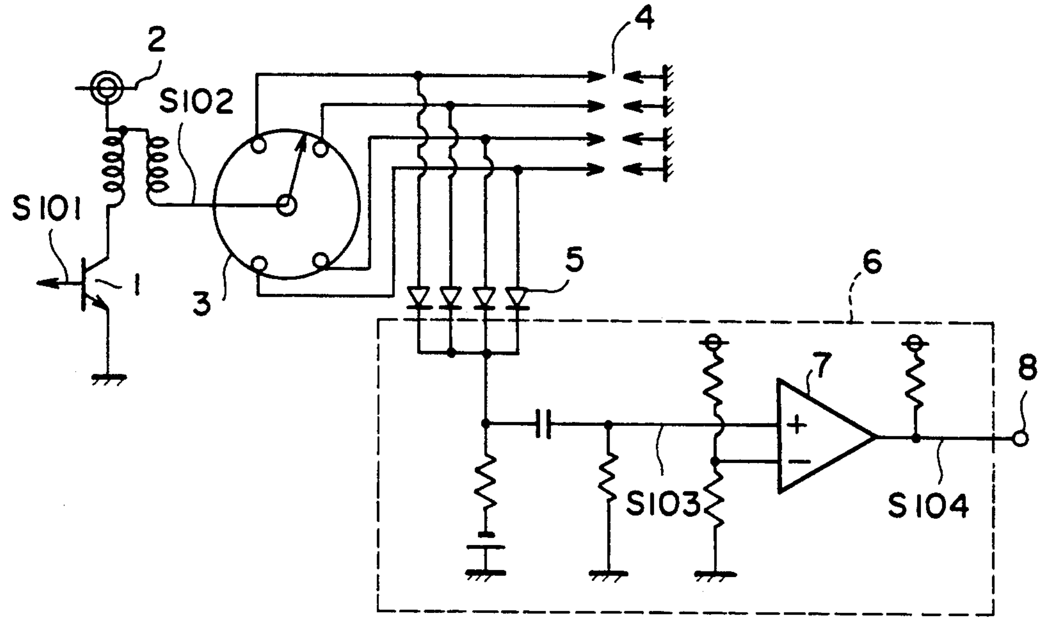
FIG. 5 is a circuit diagram showing a known combustion detecting apparatus.
Figure 6:
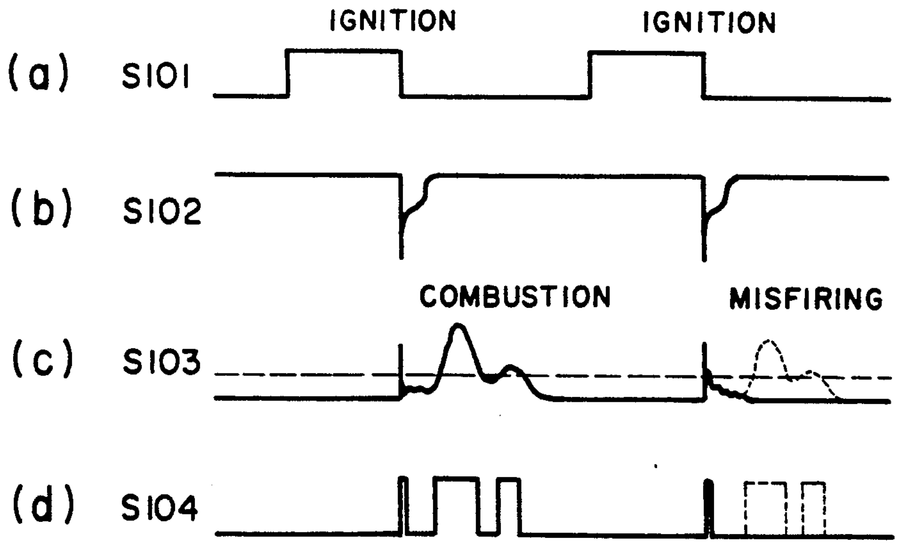
FIG. 6 is a waveform diagram for illustrating operation of the same.

FIG. 1 shows a combustion detecting apparatus 6A according to a first embodiment of the invention. In this figure, parts denoted by reference numerals 1 through 5 are the same as those shown in FIG. 5. Accordingly, repeated description thereof will be unnecessary. The combustion detecting apparatus 6A according to the first embodiment includes an ion current detecting circuit, generally denoted by reference numeral 101, for applying a voltage of positive polarity to each spark plug 4 to detect an ion current of negative polarity produced by combustion of an air/fuel mixture within each cylinder and for generating a corresponding ion current detection signal of negative polarity, a conversion means in the form of an invertor circuit, generally denoted by reference numeral 103, for converting the ion current detection signal to a signal of positive polarity, and a waveform shaping means 105 comparing the output signal from the invertor circuit 103 with a predetermined threshold voltage and generating an output signal when the output signal from the invertor circuit 103 is higher than a predetermined reference voltage. The ion current detecting circuit 101 includes a DC power supply 101*a* having a positive terminal connected through a resistor 101*b* to one end of a secondary winding of the ignition coil 2, the other end of which is connected through a distributor 3 to the spark plugs 4, and a serial connection of a capacitor 101*c* and a resistor 101*d* connected in parallel with a serial connection of the resistor 101*b* and the power supply 101*a* between the one end of the secondary winding of the ignition coil 2 and ground. The convertor circuit 103 includes an invertor 103*a* having a negative input terminal connected through a resistor 101*e* to a junction between the capacitor 101*c* and the resistor 101*d*, and a positive input terminal connected to ground, and an output terminal connected through a resistor 103*b* to the negative input terminal. The invertor 103*a* inverts the polarity of the output signal S3 (shown at (c) in FIG. 2) of the ion current detecting circuit 101 and generates an output signal S4 (shown at (d) in FIG. 2) of positive polarity. The waveform shaping circuit 105 comprises a comparator having a positive input terminal connected to the output terminal of the comparator 103*a* of the invertor circuit 103, a negative input terminal to which a predetermined threshold voltage is applied by a threshold generating circuit 105*a*, and an output terminal for generating an output signal when the output signal from the invertor 103*a* is higher than the predetermined threshold voltage applied to the negative input terminal.

The combustion detecting apparatus 6A further comprises a filter means in the form of a low pass filter, generally denoted by reference numeral 107, for allowing the passage of only the output signal of the comparator 105 which has a duration longer than a predetermined time. Specifically, the low pass filter 107 includes a serial connection of a resistor 107*a* and a capacitor 107*b* connected between the output terminal of the comparator 105 and ground, with a diode 107*c* being connected in parallel with and between the opposite ends of the resistor 107*a*. A comparator 107*d* has a positive input terminal connected to a junction between the resistor 107*a* and the capacitor 107*b*, a negative input terminal connected to a junction between a serial connection of resistors 107*e*, 107*f* which are serially connected between a power supply and ground for applying a predetermined threshold voltage to the negative input terminal, and an output terminal connected to an output terminal 109 of the combustion detecting apparatus 6A.

Further, the secondary winding of the ignition coil 2 has one end connected through the resistor 101*b* to the positive terminal of the power supply 101*a*, and the other end connected to a movable contact of the distributor 3. Besides, a plurality of ion current sensing diodes 5 are incorporated in the distributor 3 in such a manner as to allow an electric current to flow from the secondary winding of the ignition coil 2 to the spark plugs 4, as shown in FIG. 1. With such an arrangement, a positive voltage is applied between the electrodes of each spark plug 4 so that the electrodes can catch or attract negative ions and free electrons which are generated during combustion of an air/fuel mixture in an engine cylinder. At this juncture, it should further be noted that the amount of negative ions (or anions) and free electrons thus produced is much greater than that of positive ions (or cations).

Figure 2:
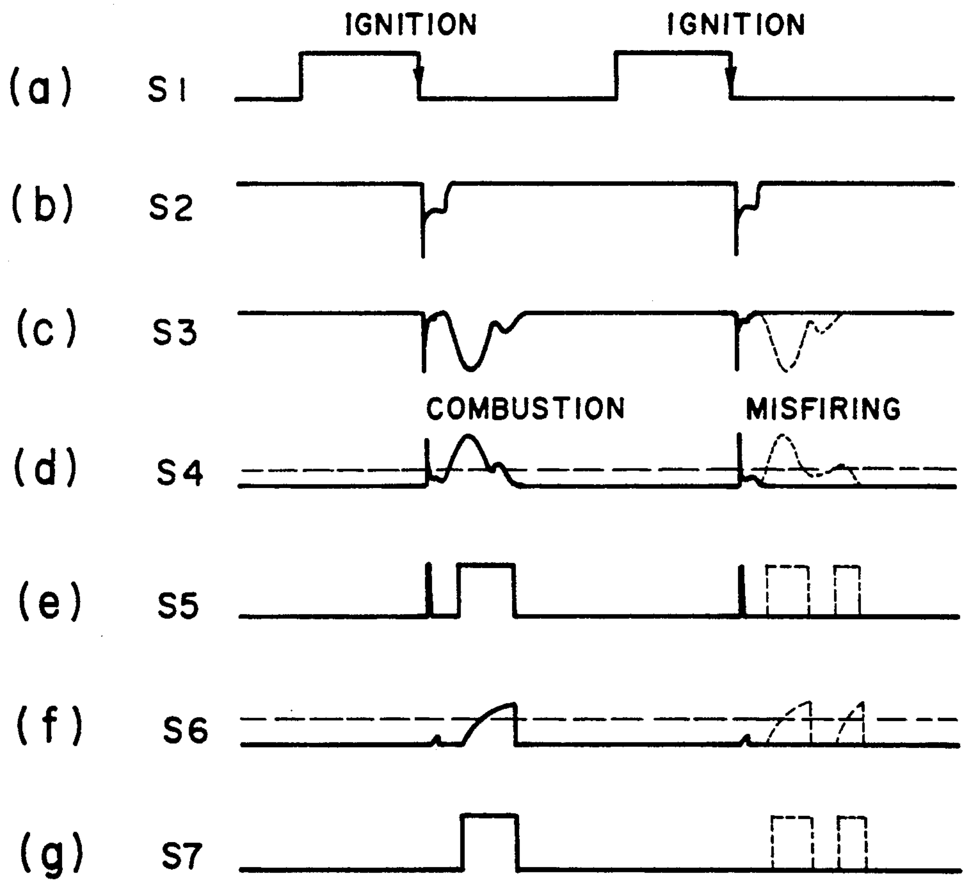
FIG. 2 is a waveform diagram for illustrating operation of the combustion detecting apparatus shown in FIG. 1.

Operation of the combustion current detecting apparatus according to the first embodiment of the invention will now be described by reference to a waveform diagram shown in FIG. 2. When an ignition signal S1 having a pulse waveform shown at (a) in FIG. 2 is applied to the base of the power transistor 1, the transistor 1 is turned on, and at the falling edge of the ignition pulse, it is turned off, whereby a high voltage S2, as shown at (b) in FIG. 2, is induced across the secondary winding of the ignition coil 2 and is distributively applied to the spark plugs 4 of the individual engine cylinders through the distributor 3 to generate a spark at each spark plug 4. As a result of this, an air/fuel mixture within the associated cylinder undergoes explosive combustion, which is accompanied by generation of an ion current or flow. The negative ions as well as free electrons contained in this ion flow are supplied to the ion current detecting circuit 101 as an ion current detection signal S2, as illustrated at (b) in FIG. 2, through the respective diodes 5 in the distributor 3 and the secondary winding of the ignition coil 2. The ion current detecting circuit 101 generates an ion current detection signal S3, as shown at (c) in FIG. 2, which is then inverted in polarity by the invertor circuit 103, whereby a signal S4 having a waveform as shown at (d) in FIG. 2 is outputted from the invertor circuit 103 and subsequently supplied to the comparator 105 for comparison with the predetermined reference voltage. There is thus produced at the output of the comparator 105 a signal having a waveform as illustrated at (e) in FIG. 2. The signal S5 is then applied to the low pass filter 107 where it is filtered or shaped into a signal S6 having a waveform as shown at (f) in FIG. 2. This signal S6 is further compared with a reference voltage by the comparator 107*d*, the output of which represents an ion current detection output signal S7, as shown at (g) in FIG. 2. So long as this ion current detection output signal S7 is at a high level, it is decided that normal combustion takes place within the cylinder. In contrast, when the ion current detection output signal S7 assumes a low level, abnormal combustion (i.e., occurrence of misfiring) is determined. Parenthetically, it has been experimentally established that the amount of negative ions and free electrons is several ten times as large as that of the positive ions. Consequently, a sufficiently high ion current detection level can be ensured. It should be added that the reference voltage of the comparator 105 may be set to be constant or variable in dependence on engine operating parameters such as the engine speed, engine load and the like.

As will now be appreciated, by virtue of such an arrangement that the negative ions and free electrons in the ion flow generated upon combustion of the air/fuel mixture are extracted and transformed to a signal of positive polarity which is then subjected to the waveform shaping processing to thereby obtain an ion current detection output signal, it is possible, according to the first embodiment of the invention, to accurately detect the ion current even when the engine is operated at a high speed or under a heavy load.

Figure 3:
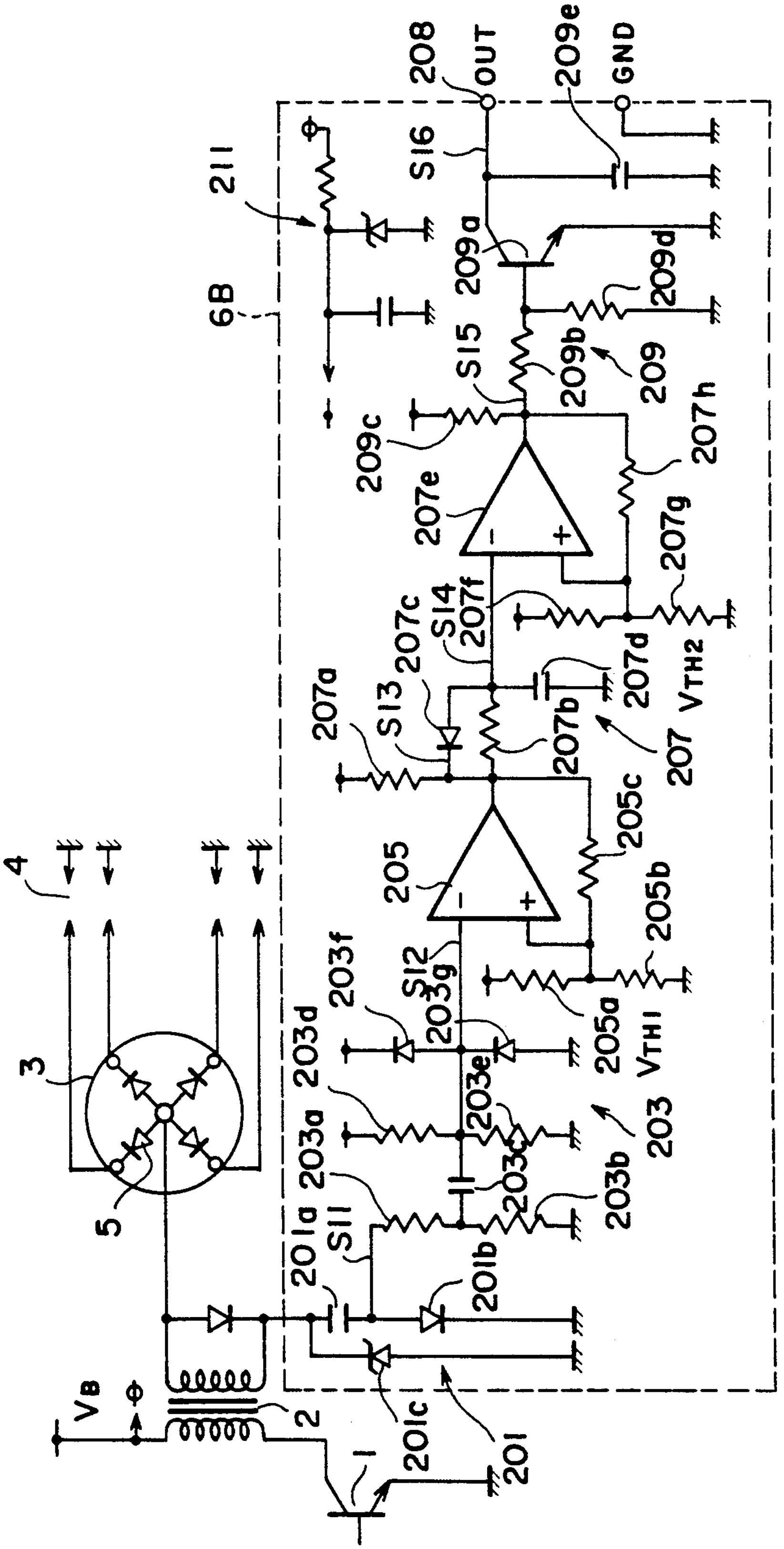
FIG. 3 is a circuit diagram similar to FIG. 1 but shows a combustion detecting apparatus according to a second embodiment of the invention.

Next, description will be turned to a second embodiment of the combustion detecting apparatus according to the invention by particular reference to FIG. 3, in which like parts as those shown in FIG. 1 are denoted by like reference numerals, and repeated description thereof is omitted. The combustion detecting apparatus according to the second embodiment, generally designated by reference symbol 6B, comprises an ion current detecting circuit 201 for applying a voltage of positive polarity to each spark plug 4 to detect an ion current of negative polarity produced by combustion of an air/fuel mixture within each cylinder and for generating a corresponding ion current detection signal of negative polarity, a biasing circuit 203 for shifting the ion current detection signal from the ion current detecting circuit 201 by a predetermined bias voltage to provide a shifted ion current detection signal of positive polarity, a comparator 205 for comparing the shifted ion current detection signal with a first reference voltage VTH1 of positive polarity which is shifted by a predetermined value from the bias voltage, a filter means 207 in the form of a low pass filter for allowing the passage of only the output signal of the comparator 205 which has a duration longer than a predetermined time, and an invertor circuit 209 for converting the polarity of the output signal of the filter means 207 to provide a signal of positive polarity indicative of the state of combustion within the cylinder.

The ion current detecting circuit 201 includes a serial connection of a capacitor 201*a* and a diode 201*b* connected between one end of a secondary winding of the ignition coil 2 and ground with a Zener diode 201*c* being connected in parallel therebetween. The ion current detecting circuit 201 generates an ion current signal S11 having a waveform similar to the output signal S3 of the ion current detecting circuit 101 of FIG. 1, as illustrated at (a) in FIG. 4.

The biasing circuit 203 includes a serial connection of a resistor 203*a* and a resistor 203*b* connected between a junction of the capacitor 201*a* and the diode 201*b* and ground, a capacitor 203*c* having one end thereof connected to a junction between the resistors 203*a*, 203*b*, a serial connection of resistors 203*d*, 203*e* connected between a power supply 211 and ground with a junction therebetween being coupled to the other end of the capacitor 203*c*, and a serial connection of diodes 203*f*, 203*g* connected between the power supply 211 and the ground with a junction therebetween coupled to the junction between the resistors 203*d*, 203*e*. The biasing circuit 203 shifts the negative output signal S11 of the ion current detecting circuit 201 by a predetermined bias voltage VCC to a positive signal S12, as shown at (b) in FIG. 4.

The comparator 205 has a negative input terminal connected to the junction between the diodes 203*f*, 203*g*, and a positive input terminal connected to a junction between resistors 205*a*, 205*b*, and an output terminal connected through a resistor 205*c* to the positive input terminal. Thus, the shifted voltage S12 from the biasing circuit 203 is supplied to the negative input terminal of the comparator 205, whereas a first predetermined positive reference voltage VTH1 is imposed upon the positive input terminal of the comparator 205, so that the comparator 205 generates a high-level signal when the shifted signal S12 is lower than the first reference voltage VTH1, as shown at (c) in FIG. 4, thus properly shaping the waveform of the shifted signal S12.

The low pass filter 207 includes a resistor 207*a* having one end thereof connected to the power supply 211 and the other end thereof connected to the output terminal of the comparator 205, a resistor 207*b* having one end thereof coupled to a junction between the output terminal of the comparator 205 and the resistor 207*a* and the other end thereof coupled through a diode 207*c* to a junction between the resistors 207*a*, 207*b*, and a capacitor 207*d* connected between the other end of the resistor 207*b* and ground. A comparator 207*e* has a negative input terminal connected to a junction between the resistor 207*b* and the capacitor 207*d*, a positive input terminal connected to a junction between resistors 207*f*, 207*g*, and an output terminal coupled through a resistor 207*h* to the positive input terminal. Thus, the output signal S13 of the comparator 205 is filtered by the low pass filter 207 to provide a filtered signal S14, as shown at (d) in FIG. 4, which is then supplied to the negative input terminal of the comparator 207*e* for comparison with a second predetermined reference voltage VTH2 imposed on the positive input terminal thereof. The comparator 207*e* generates a high-level output signal when the signal S14 is lower than the second reference voltage VTH2, as shown at (e) in FIG. 4, masking the filtered output S14 for a predetermined period or duration.

The invertor circuit 209 includes a transistor 209*a* which has a base coupled through a resistor 209*b* to the output terminal of the comparator 207*e*, an emitter connected to ground, and a collector connected to an output terminal 208 of the combustion detecting apparatus 6B. A resistor 209*c* is connected at one end thereof to the power supply 211 and at the other end thereof to a junction between the output terminal of the comparator 209*e* and the resistor 209*b*. A resistor 209*d* is connected at one end thereof to a junction between the resistor 209*a* and the base of the transistor 209*a*, and at the other end thereof to ground. A capacitor 209*e* is connected between the collector of the transistor 209*a* and ground. The converter circuit 209 inverts the voltage level of the output signal of the comparator 207*e* from a high to a low level and vice versa to provide an inverted signal S16, as shown at (f) in FIG. 4.

Figure 4:
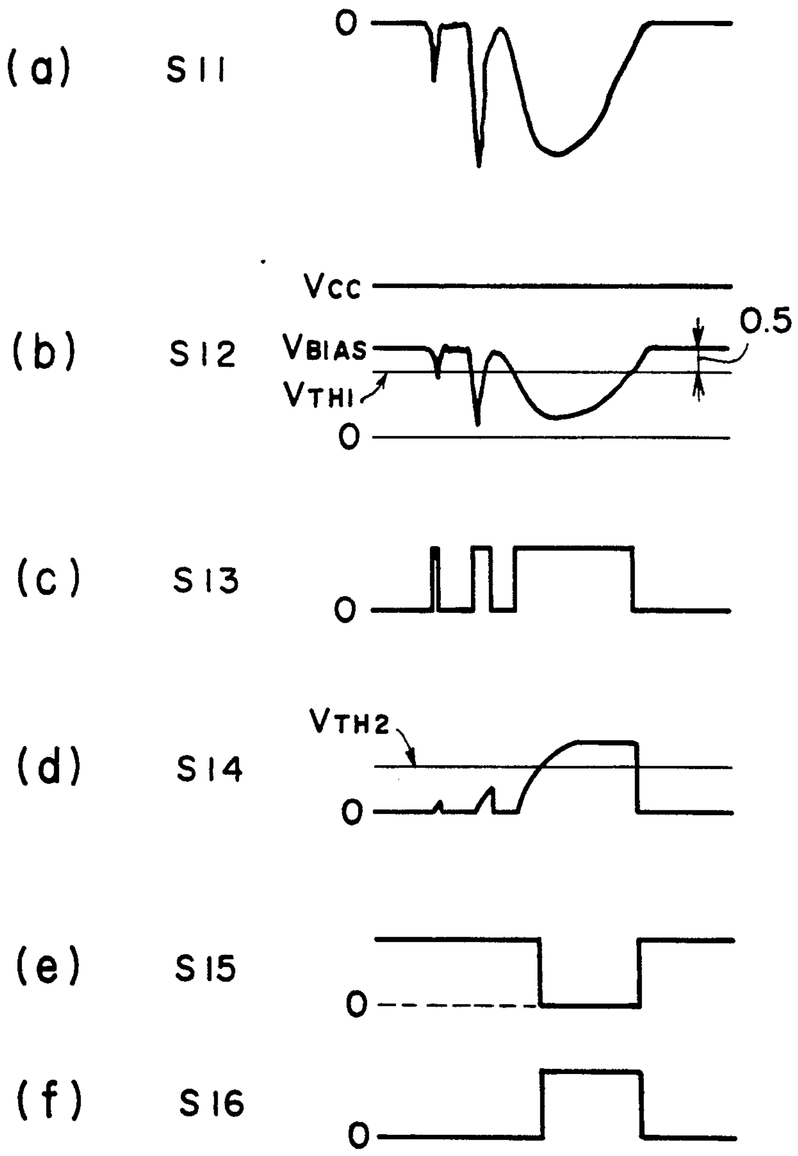
FIG. 4 is a waveform diagram for illustrating operation of the apparatus shown in FIG. 3.

Operation of the combustion detecting apparatus 6B of FIG. 3 will now be described by reference to the waveform diagrams of FIG. 4. The power transistor 1 is turned on in response to a rising edge of an ignition signal applied to the base thereof. Upon turning-off of the power transistor 1, a high voltage is induced across the secondary winding of the ignition coil 2 and applied to the spark plugs 4 of the individual cylinders through the distributor 3. As a result, combustion of the air/fuel mixture in each cylinder takes place, being accompanied by generation of an ion current or flow, from which negative ions and free electrons are detected by the associated diode 5 as an ion current detection signal S11 having a waveform as illustrated at (a) in FIG. 4. This signal S11 is shifted by the bias voltage VCC of a predetermined magnitude by the biasing circuit 203 to provide a signal S12, as shown and indicated by symbol VBIAS at (b) in FIG. 4, which is then supplied to the comparator 205 where it is compared with the first reference voltage VTH1 to provide an output signal S13, as shown at (c) in FIG. 4. The output signal S13 is then caused to pass through the low pass filter 207, to provide an output signal S14 having a waveform, as shown at (d) in FIG. 4. This signal S14 is further compared with the second reference voltage VTH2 by the comparator 207*e*, whereby a signal S15, as shown at (e) in FIG. 4, is obtained after having been masked for a predetermined duration. The signal S15 is then inverted in its level by the invertor circuit 209, the output of which represents the ion current detection output signal S16 of a waveform, as shown at (f) in FIG. 4. As described hereinbefore, the high level of the ion current detection output signal S16 indicates normal combustion while the low level thereof indicates abnormal combustion or occurrence of misfiring.

With the teachings of the invention incarnated in the combustion detecting apparatus according to the second embodiment of the invention, the ion current can be detected positively or reliably even in the high speed running state or heavy load state of the engine as in the case of the apparatus according to the first embodiment of the invention.

Moreover, in the above embodiments, the low pass filter 107, 207 is so designed as to pass only the shaped signal of a waveform that has a pulse width or duration greater than a predetermined length. Usually, noise originating in various sources in the motor vehicle equipped with the combustion detecting apparatus is of a very short duration. Accordingly, these noise components can be filtered out by the low pass filter 107, 207, whereby the risk of the noise components being erroneously determined as being due to combustion can be excluded. In other words, combustion and misfiring can be identified definitely and discriminatively from each other on the basis of the output signal S6, S16 of the ion current detection circuit 6A, 6B without being adversely affected by noise. As a result, the facility for discriminating noise from the intrinsic combustion signal, which would otherwise be required, can be spared.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. A combustion detecting apparatus for an internal combustion engine, comprising:

ion current detecting means for applying a voltage of positive polarity to a spark plug of a cylinder of said engine to detect an ion current of negative polarity produced by combustion of an air/fuel mixture within said cylinder, said current detecting means being operable to output an ion current detection signal of negative polarity;

conversion means for converting said ion current detection signal to a signal of positive polarity; and waveform shaping means for shaping said signal of positive polarity from said conversion means by using a predetermined voltage for comparison to generate a combustion detection signal indicative of the state of combustion in the cylinder.

2. A combustion detecting apparatus according to claim 1, further comprising filter means for allowing the passage of only the output signal of said waveform shaping means which has a duration longer than a predetermined time.

3. A combustion detecting apparatus according to claim 1, further comprising an ignition coil having a primary winding to which an ignition pulse signal is applied and a secondary winding inductively coupled to said primary winding, said secondary winding having a first end of positive polarity connected to said spark plug, and a second end of negative polarity connected to an input of said ion current detecting means.

4. A combustion detecting apparatus according to claim 3, wherein the first end of said secondary winding is connected to a plurality of spark plugs through a distributor which has movable and fixed contacts with an ion current sensing diode connected therebetween.

5. A combustion detecting apparatus according to claim 1, wherein said waveform shaping means comprises a comparator for comparing the output signal of said conversion circuit with a predetermined threshold level.

6. A combustion detecting apparatus for an internal combustion engine, comprising:

ion current detecting means for applying a voltage of positive polarity to a spark plug of a cylinder of said engine to detect an ion current of negative polarity which is produced by combustion of an air/fuel mixture within said cylinder, said ion current detecting means being operable to output an ion current detection signal of negative polarity;

biasing means for shifting said ion current detection signal of negative polarity by a predetermined bias voltage into a positive signal;

first comparison means for comparing said shifted ion current detection signal of positive polarity with a first reference voltage of positive polarity;

filter means for allowing the passage of only the output signal of said first comparison means which has a duration longer than a predetermined time;

second comparison means for comparing the output of said filter means with a second reference voltage; and invertor means for inverting the voltage level of the output signal of said second comparison means from a high to a low level and the vice versa to provide a signal indicative of the state of combustion within the cylinder.

7. A combustion detecting apparatus according to claim 6, further comprising an ignition coil having a primary winding to which an ignition pulse signal is applied and a secondary winding inductively coupled to said primary winding, said secondary winding having a first end of positive polarity connected to said spark plug, and a second end of negative polarity connected to an input of said ion current detecting means.

8. A combustion detecting apparatus according to claim 7, wherein the first end of said secondary winding is connected to a plurality of spark plugs through a distributor which has movable and fixed contacts with an ion current sensing diode connected therebetween.

* * * * *